United States Patent
Koehler et al.

(10) Patent No.: US 12,297,872 B1
(45) Date of Patent: May 13, 2025

(54) PRESSURE RETAINING CAP WITH MANUAL INTERFACE FOR ROTATION

(71) Applicant: Hamilton Sundstrand Corporation, Charlotte, NC (US)

(72) Inventors: Matthew Daniel Koehler, Rockford, IL (US); Nicholas Craig, Austin, TX (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/526,719

(22) Filed: Dec. 1, 2023

(51) Int. Cl.
*F16D 25/08* (2006.01)
*F16D 23/12* (2006.01)
*F16D 48/02* (2006.01)

(52) U.S. Cl.
CPC ............. *F16D 23/12* (2013.01); *F16D 48/02* (2013.01); *F16D 2023/123* (2013.01); *F16D 2300/26* (2013.01)

(58) Field of Classification Search
CPC .............. F16D 23/12; F16D 2023/123; F16D 2300/26
See application file for complete search history.

(56) References Cited

U.S. PATENT DOCUMENTS

| | | | | |
|---|---|---|---|---|
| 3,188,922 | A * | 6/1965 | Cruse | F16J 10/02 92/108 |
| 3,896,706 | A * | 7/1975 | Newstead | B60T 17/083 92/108 |
| 4,093,038 | A * | 6/1978 | Molin | B60T 17/083 92/64 |
| 4,245,724 | A * | 1/1981 | Beck | F16D 59/02 192/85.37 |
| 5,056,678 | A | 10/1991 | Grills et al. | |
| 9,121,461 | B1 | 9/2015 | Scherman et al. | |
| 10,975,772 | B2 * | 4/2021 | Jiang | F16D 1/076 |
| 2005/0282670 | A1 * | 12/2005 | Kim | B62J 13/04 474/144 |
| 2010/0089681 | A1 * | 4/2010 | Inomori | F16D 43/12 192/70.23 |
| 2020/0148058 | A1 * | 5/2020 | Eschenburg | B60K 17/36 |
| 2022/0205466 | A1 | 6/2022 | Bhaskar et al. | |

FOREIGN PATENT DOCUMENTS

| | | | | |
|---|---|---|---|---|
| CN | 207261785 U | * | 4/2018 | |
| CN | 208331403 U | * | 1/2019 | F16K 31/143 |
| KR | 101394812 B1 | | 5/2014 | |

OTHER PUBLICATIONS

Extended European Search Report for EP Application No. 24203735.6, dated Mar. 10, 2025, 9 pages.

* cited by examiner

Primary Examiner — Stacey A Fluhart
(74) Attorney, Agent, or Firm — Kinney & Lange, P. A.

(57) ABSTRACT

A system includes a cap configured to attach to a first end of a pneumatic disconnect shaft assembly, the cap configured to seal a pneumatic chamber in a pneumatic mode and configured to allow access to the pneumatic chamber in a manual mode for manual rotation of a decoupling shaft. A method for manual rotation of a pneumatic disconnect shaft assembly includes removing a bolt from a cap that seals a pneumatic chamber of the pneumatic disconnect shaft assembly and rotating the cap about a longitudinal axis of a decoupling shaft to rotate the decoupling shaft, camming one or more locking pistons out of one or more grooves in the decoupling shaft.

20 Claims, 8 Drawing Sheets

PRESSURE RETAINING CAP WITH MANUAL INTERFACE FOR ROTATION

STATEMENT OF GOVERNMENT RIGHTS

This invention was made with government support under Contract No. SPE4AX-18-D-9407-FA8212-22-F-0003 awarded by the United States Air Force. The government has certain rights in the invention.

BACKGROUND

1. Field

The present disclosure relates to disconnect mechanisms, and more particularly to mechanical disconnects for disconnecting power trains, such as can be used for disconnecting actuators, gearboxes, prime movers, accessories, and the like, aboard aircraft.

2. Description of Related Art

In power transmission devices, such as a gearboxes aboard aircraft, it is often necessary to include a mechanism that can mechanically separate two power train shafts that carry a rotational load between them. This can be done for a multitude of reasons including needing to run either the upstream or downstream components without driving the entire system and disconnecting the sections in the event that one component fails. It can sometimes be necessary to manually actuate the disconnect mechanism without electrical power or pneumatic air supply.

The conventional techniques have been considered satisfactory for their intended purpose. However, there is an ever-present need for improved systems and methods for mechanical disconnects. This disclosure provides a solution for this need.

SUMMARY

A system includes a cap configured to attach to a first end of a pneumatic disconnect shaft assembly, the cap configured to seal a pneumatic chamber in a pneumatic mode and configured to allow access to the pneumatic chamber in a manual mode for manual rotation of a decoupling shaft. The cap can include a bolt bore through the cap, the bolt bore configured to align with a bore in a housing of the pneumatic disconnect shaft assembly. A bolt can extend through the bolt bore into the bore of the housing.

In certain embodiments, the bolt can be configured to secure the cap to the housing in the pneumatic mode thereby sealing the pneumatic chamber of the pneumatic disconnect shaft assembly. In other embodiments, the bolt can be removeable from the bolt bore and the bore of the housing.

In certain embodiments, the cap can include a tab integrally formed with and extending from an outer surface of the cap along a longitudinal axis. A user can rotate the tab in the manual mode. The cap can further include an internal bore and an-anti-rotation pin received within the internal bore. In the pneumatic mode, the anti-rotation pin can be stationary within the internal bore and the cap can be secured to a housing of the pneumatic disconnect shaft assembly via a bolt.

In certain embodiments, the pneumatic disconnect shaft assembly can include a decoupling shaft engaged in a housing for axial movement relative to the housing along a longitudinal axis of the decoupling shaft back and forth between a first position for coupling and a second position for decoupling. The decoupling shaft can be engaged in the housing for rotational movement relative to the housing about the longitudinal axis. The pneumatic disconnect shaft assembly can include a first locking piston engaged to the housing and operatively connected to a first compartment of a pneumatic chamber of the housing. The first locking piston can be biased radially inward to engage a first groove in the decoupling shaft to lock the decoupling shaft in the second position. The pneumatic disconnect shaft assembly can include a second locking piston engaged to the housing and operatively connected to a second compartment of the pneumatic chamber. The second locking piston can be biased radially inward to engage a second groove in the decoupling shaft to lock the decoupling shaft in the first position.

In certain embodiments, the pneumatic disconnect shaft assembly can further include an anti-rotation pin engaged in a diametrical groove through the decoupling shaft to prevent rotation of the decoupling shaft relative to the housing in the pneumatic mode. The anti-rotation pin can be configured to be manually removed from the housing via rotation of the cap to allow manual rotation of the decoupling shaft in the manual mode.

In certain embodiments, the anti-rotation pin can be configured to be engaged within the diametrical groove in the decoupling shaft to facilitate manual rotation of the decoupling shaft. The diametrical groove can include a set of axially extending helical threads configured to engage the bolt to facilitate manual axial actuation of the decoupling shaft.

The first groove can include a first cam with a first camming surface extending circumferentially around the decoupling shaft. The anti-rotation pin can be engaged to the decoupling shaft and to the housing. The first groove can have a deep section of the first cam circumferentially aligned with the first locking piston for selectively locking and unlocking the first locking piston from the first groove for remotely controlled pneumatic operation. The first cam can include a first tangent portion that is tangent to a first portion of the decoupling shaft axially adjacent to the first groove for manual operation with the anti-rotation pin removed and with the decoupling shaft rotated to circumferentially align the first tangent portion with the first locking piston.

The second groove can include a second cam with a second camming surface extending circumferentially around the decoupling shaft. The anti-rotation pin can be engaged to the decoupling shaft and to the housing. The second groove can have a deep section of the second cam circumferentially aligned with the second locking piston for selectively locking and unlocking the second locking piston from the first groove for remotely controlled pneumatic operation. The second cam can include a second tangent portion that is tangent to a second portion of the decoupling shaft axially adjacent to the second groove for manual operation with the anti-rotation pin removed and with the decoupling shaft rotated to circumferentially align the second tangent portion with the second locking piston.

The decoupling shaft can be configured so rotation of the decoupling shaft about the longitudinal axis by 90-degrees from an initial position with the anti-rotation pin in place positions the first and second cams to circumferentially align the first and second tangent portions with the first and second locking pistons for manual actuation of the decoupling shaft.

A method for manual rotation of a pneumatic disconnect shaft assembly includes removing a bolt from a cap that seals a pneumatic chamber of the pneumatic disconnect shaft assembly and rotating the cap about a longitudinal axis of a decoupling shaft to rotate the decoupling shaft, camming one or more locking pistons out of one or more grooves in the decoupling shaft.

In certain embodiments, the method can further include removing the cap and an anti-rotation pin operatively associated with the cap to allow for axial movement of the decoupling shaft. The method can further include threading the bolt into threads in a diametrical groove within the decoupling shaft of the pneumatic disconnect shaft assembly to facilitate axial movement of the decoupling shaft.

In certain embodiments, the method can include unthreading the bolt from the diametrical groove in the decoupling shaft, inserting the cap and the anti-rotation pin operatively associated therewith into the diametrical groove, rotating the cap to cam the one more locking pistons into the one or more grooves to secure the anti-rotation pin, and inserting the bolt through the cap into a housing of the pneumatic disconnect shaft assembly to seal the pneumatic chamber.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
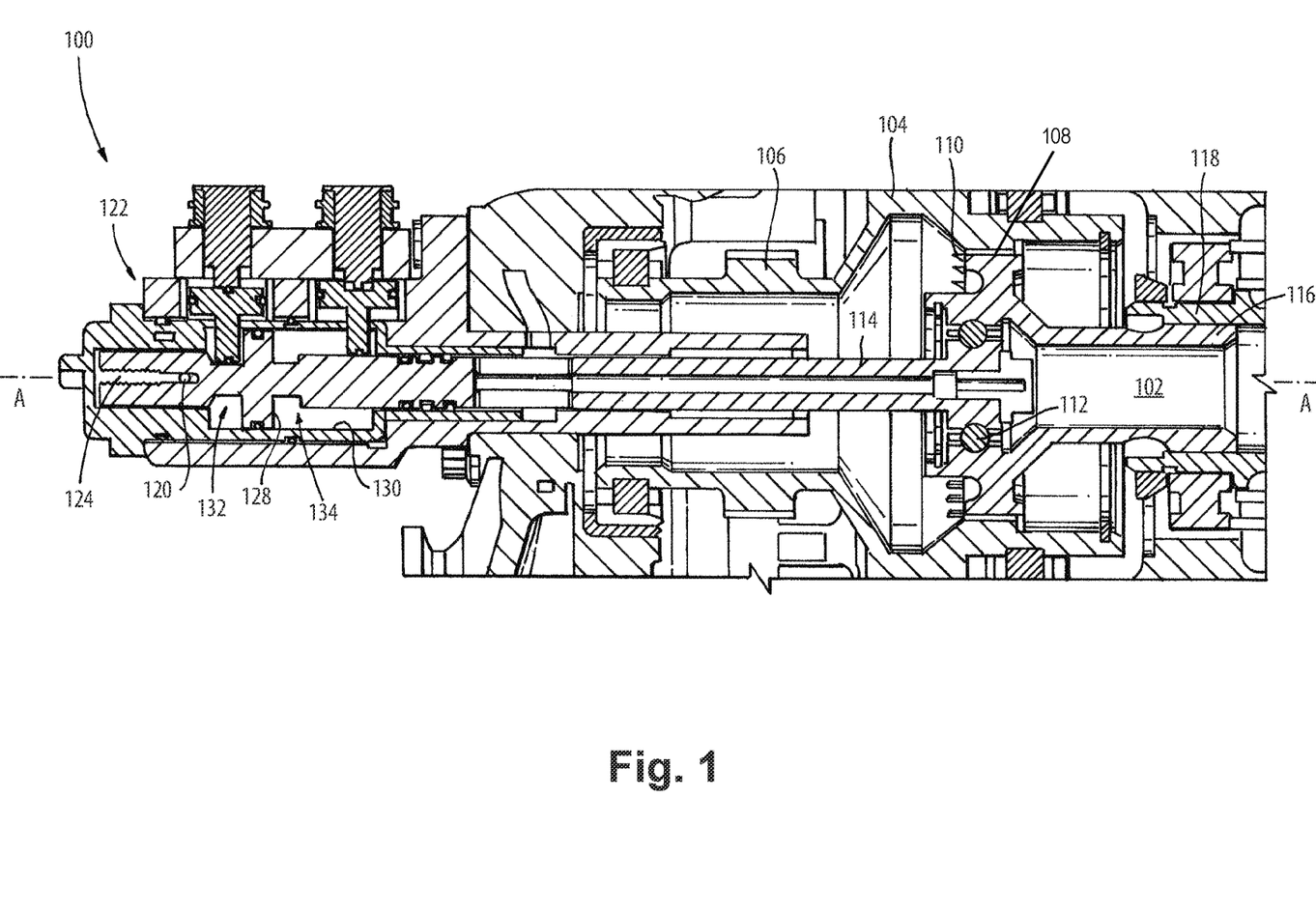
FIG. 1 is a schematic cross-sectional side elevation view of an embodiment of a system constructed in accordance with the present disclosure, showing the first and second shafts engaged for common rotation.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-12, as will be described. The systems and methods described herein can be used to facilitate manual actuation of a disconnect mechanism.

The system 100 disclosed herein mechanically separates two rotating shafts, in both static and loaded operation, through a remote command. In this case the decoupler is configured for an Airframe Mounted Accessory Drive (AMAD) such that the gearbox can be disconnected from the input shaft on command, however, those skilled in the art will readily appreciate that any other suitable disconnect application can be used. This can be particularly useful for the following events common in such a system: maintenance or operation of one side without driving the other, and emergency disconnect such as while operating at maximum load to allow continued function of one side. The decoupler is centered around a spline that connects the input shaft to the drive shaft. When coupled the splines are engaged, when decoupled the spline shifts axially to a completely disengaged position allowing for both the input shaft and drive shaft to spin independently. The actuation is completed by a pneumatically driven piston system with sensors to reflect the current state of the decoupler.

The system 100 includes a first shaft assembly 102 and a second shaft 104 splined to the first shaft assembly when the first shaft assembly is in a first axial position relative to the longitudinal axis A defined by the shafts 102, 104. This position is shown in FIG. 1, and is for common rotation of the first and second shafts 102, 104, i.e. in the coupled state. In a second axial position of the first shaft assembly 102, the first shaft assembly 102 and the second shaft 104 are separated for disconnecting the first and second shafts 102, 104 for the decoupled state. The decoupled state is shown in FIG. 2.

Figure 2:
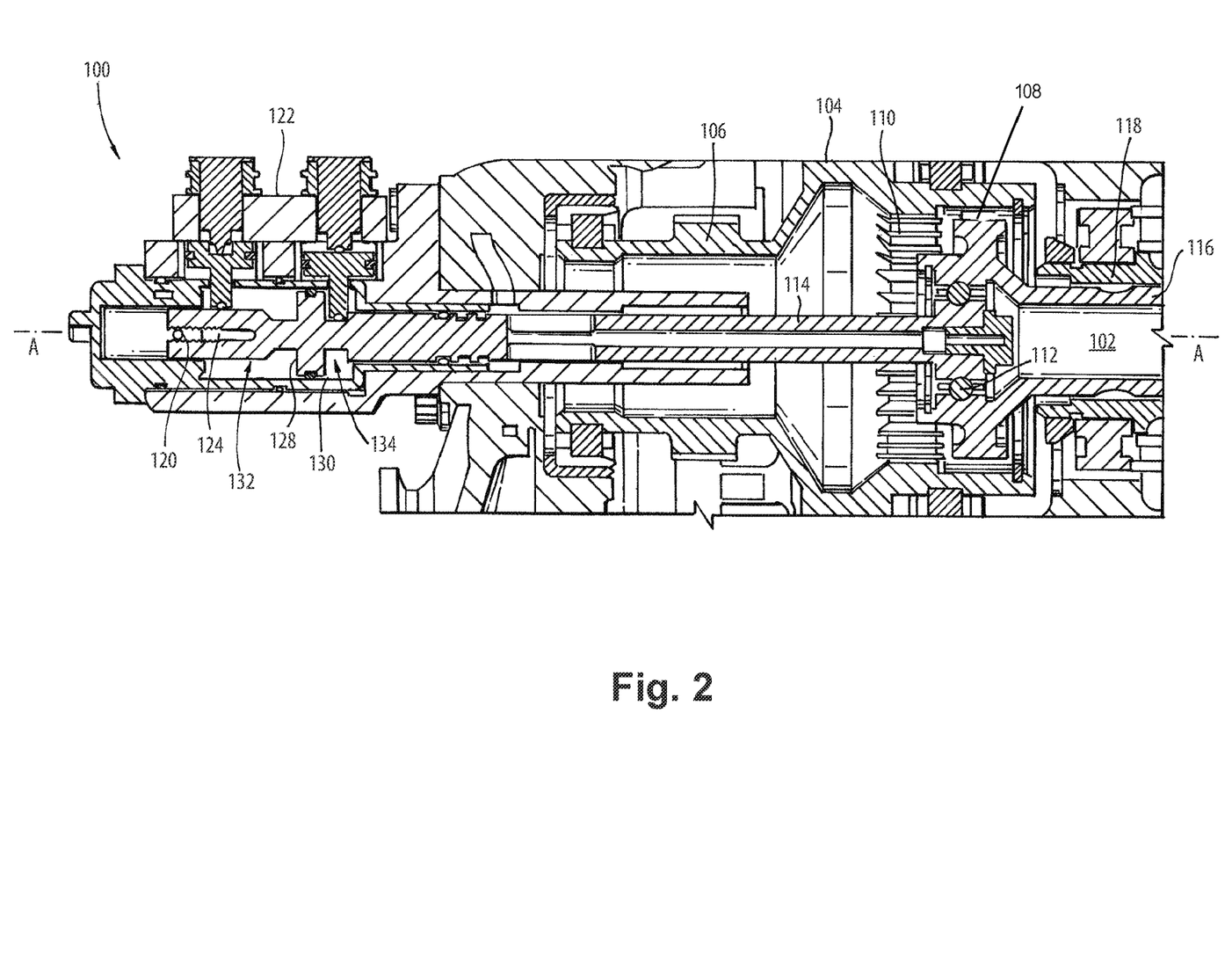
FIG. 2 is a schematic cross-sectional side-elevation view of the system of FIG. 1, showing the first and second shafts disconnected.

With continued reference to FIGS. 1 and 2, the second shaft 104 includes a spur gear 106 configured to connect the second shaft for rotation together with an airframe mounted accessory drive (AMAD). The first shaft assembly 102 includes a first set of splines 108 extending radially outward from the coupling shaft 116 of the first shaft assembly 102. The second shaft 104 includes a second set of splines 110 extending radially inward. The first set of splines 108 engages the second set of splines 110 with the first shaft assembly 102 in the first position as shown in FIG. 1. The splines 108, and 110 are axially spaced apart in the decoupled state shown in FIG. 2. The first shaft assembly 102 includes a decoupler bearing 112 engaging the first set of splines 108 to a decoupling shaft 114 of the first shaft assembly 102 for rotation of the decoupling shaft 114 relative to the first set of splines 108. During coupled rotation of the shafts 104, 116, the decoupling shaft 114 of the first shaft assembly 102 does not rotate relative to the solenoid housing 122, while the coupling shaft 116 of the first shaft assembly 102 rotates relative to the decoupling shaft 114 accommodated by the decoupler bearing 112. The bearing 112 can also accommodate rotation as needed for manual disengagement of the first shaft assembly 102 from the second shaft 104.

The first set of splines 108 are defined on a coupling shaft 116 of the first shaft assembly 102 that is operatively connected to a power input shaft 118 used for driving the coupled shafts 104, 116 with rotational power from a prime mover with the first shaft assembly 102 in the first position shown in FIG. 1. An anti-rotation pin 120 is mounted in the solenoid housing 122 of the system 100. The anti-rotation pin 120 is mounted in the pressure cap 176, which is installed into the solenoid housing 122 of the system 100. The anti-rotation pin 120 is engaged in a diametrical groove 124 through a first end of the decoupling shaft 114 to prevent rotation of the decoupling shaft 114 of the first shaft assembly 102 relative to solenoid housing 122 for pneumatic operation. The anti-rotation pin 120 is configured to be manually removed from the solenoid housing 122 for manual rotation of the decoupling shaft 114 of the first shaft assembly 102 relative to the coupling shaft 116 of the first shaft assembly 102 as needed, e.g. for maintenance. A set of axially extending helical threads 126 (labeled in FIG. 3) in the first end of the decoupling shaft 114 are configured to engage a threaded bolt to facilitate manual axial actuation of the first shaft assembly to the second position of FIG. 2 to manually disengage the splines 108, 110.

The decoupling shaft 114 includes a piston 128 in a pneumatic chamber 130 configured so that pressurizing a first compartment 134 of the pneumatic chamber on a first side of the pneumatic piston 128 actuates the first shaft assembly 102 axially toward the first position of FIG. 1, and pressurizing a second compartment 132 of the pneumatic chamber 130 on a second side of the piston 128 opposite the first side of the piston 128 actuates the first shaft assembly 102 axially toward the second position of FIG. 2.

Figure 3:
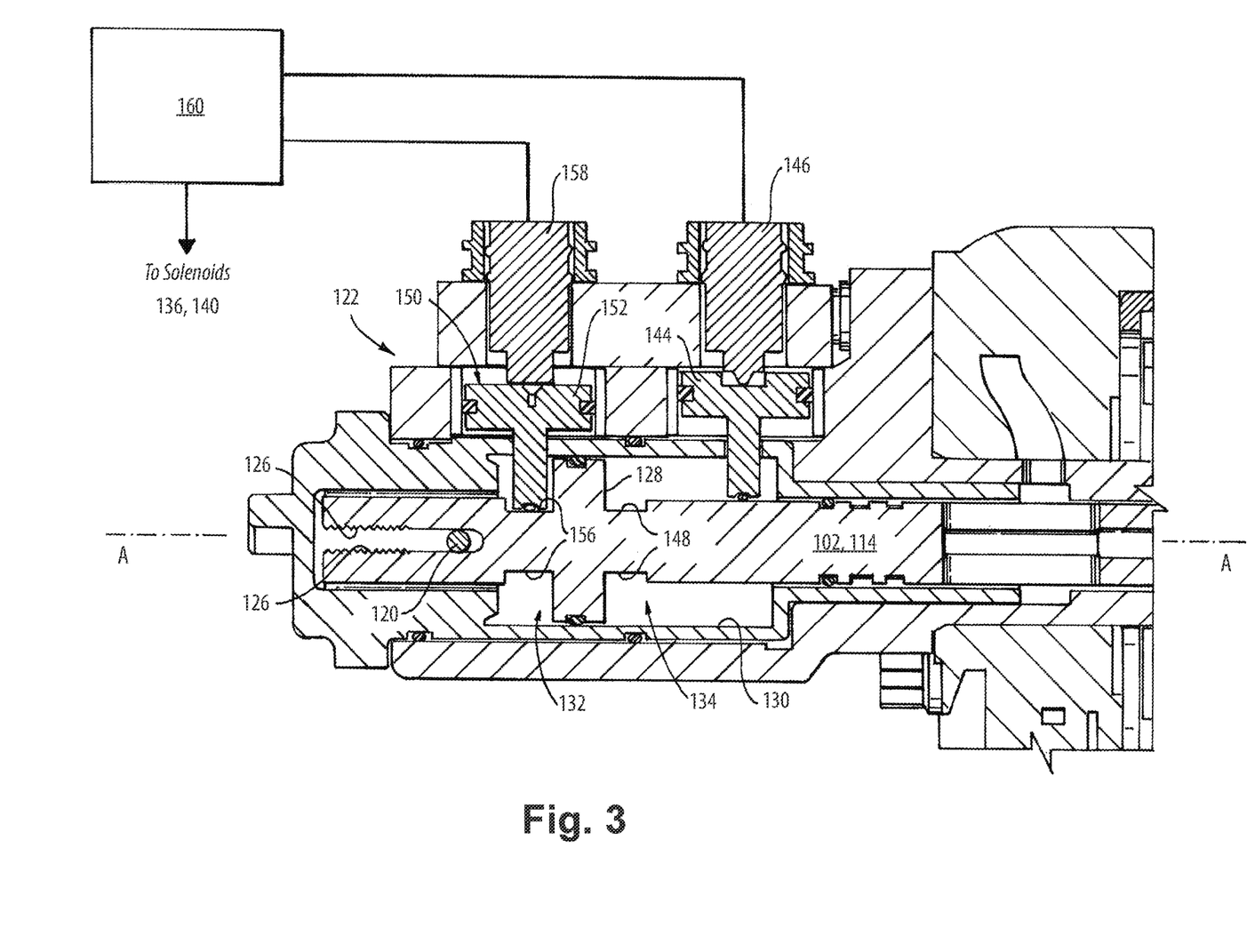
FIG. 3 is a schematic cross-sectional side-elevation view of a portion of the system of FIG. 1, showing the locking pistons.
Figure 4:
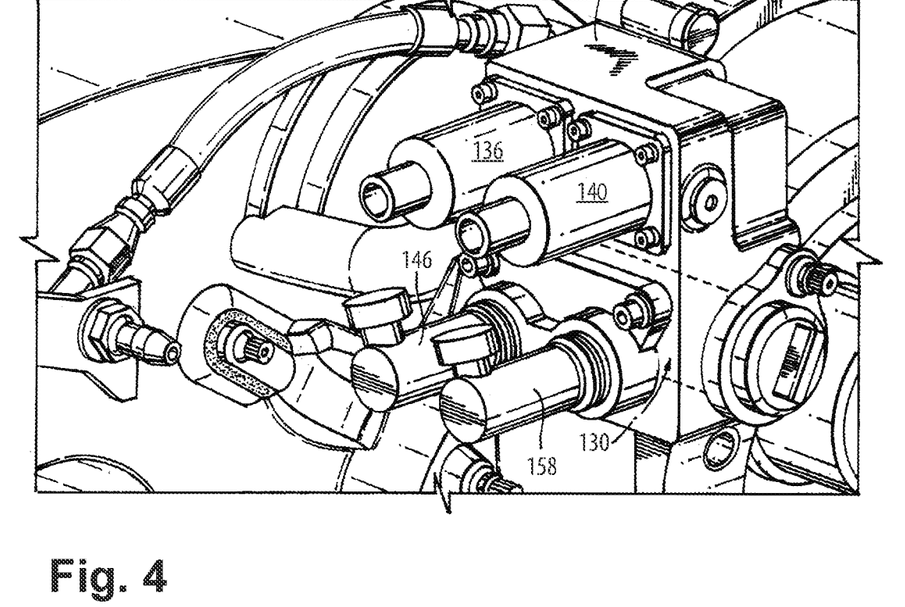
FIG. 4 is a perspective view of the system of FIG. 1, showing the solenoid housing externally.
Figure 5:
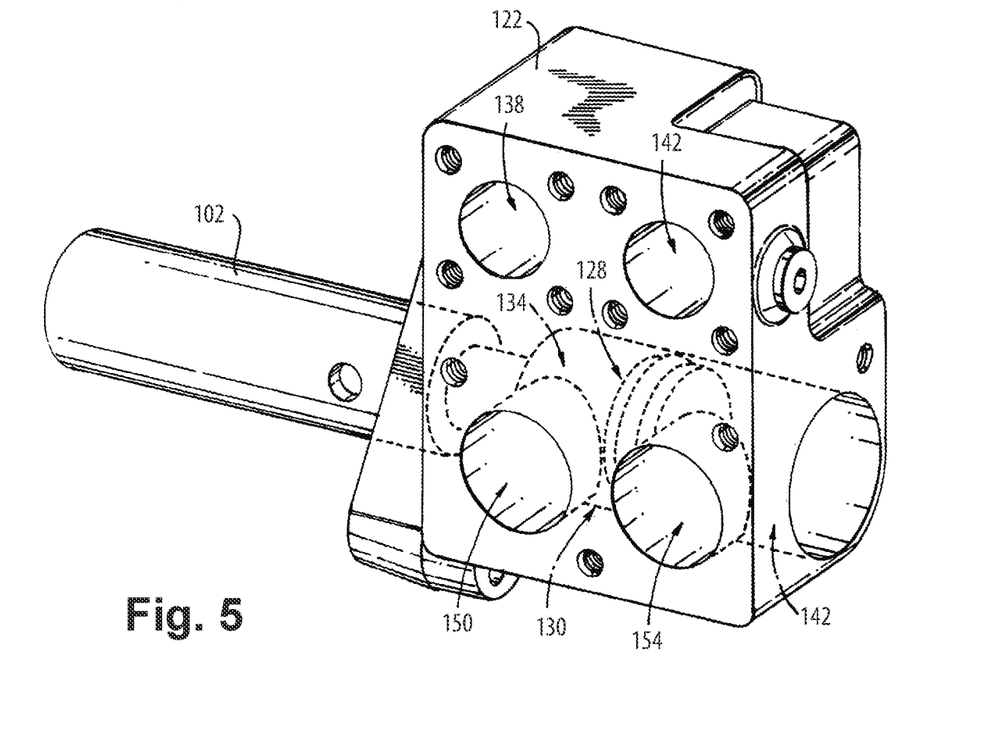
FIG. 5 is a schematic perspective view of the system of FIG. 4, showing solenoid housing internals.

With reference to FIG. 4-5 (where FIG. 4 shows an external view and FIG. 5 schematically shows internals), a first solenoid valve 136 is in fluid communication with the first compartment 134 (labeled in FIGS. 1-3) through a solenoid passage 138 for selectively pressuring the first compartment 134 to drive the piston 128 to actuate the first shaft assembly 102 toward the first position of FIG. 1. A second solenoid valve 140 is in fluid communication through a solenoid passage 142 with the second compartment 132 for selectively pressurizing the second compartment 132 to drive the piston 128 to actuate the first shaft assembly 102 toward the second position as shown in FIG. 2. The second solenoid valve 140 is configured to release pressure from the second compartment 132 to allow movement of the piston 128 toward the first position shown in FIG. 1. Similarly, the first solenoid valve 136 is configured to release pressure from the first compartment 134 to allow movement of the piston 128 toward the second position shown in FIG. 2. The first solenoid valve 136 and second solenoid valve 140 are each mounted to the solenoid housing 122, which defines the pneumatic chamber 130.

With reference now to FIG. 3, a first locking piston 144 is engaged to the solenoid housing 122 in a piston chamber 150 and is operatively connected to the first compartment 134. The first locking piston 144 is biased radially inward, e.g. by a spring in switch 146, to engage a first groove 148 in the first shaft assembly to lock the first shaft assembly in the second position as shown in FIG. 2. The first locking piston 144 is configured to move radially outward against its bias with the first solenoid 136 (shown in FIG. 4) pressurizing the first compartment 134, to disengage the first locking piston 144 from the first groove 148 to allow axial movement of the first shaft assembly 102 out of the second position shown in FIG. 2. The first locking piston switch 146 is mounted to the solenoid housing 122 and operatively connected to the first locking piston 144 to switch between a first switching state with the first locking piston 144 engaged to the first groove 148, and a second switching state with the first locking piston 144 disengaged from the first groove 148 for use as an electrical sensor for detecting state/position of the first shaft assembly 102.

A second locking piston 152 is engaged in a piston chamber 154 (labeled in FIG. 5) of the solenoid housing 122 and is operatively connected to the second compartment 132. The second locking piston 152 is biased, e.g. by a spring in the switch 158, radially inward to engage a second groove 156 in the first shaft assembly 102 to lock the first shaft assembly 102 in the first position shown in FIGS. 1 and 3. The second locking piston 152 is configured to move radially outward against its bias with the second solenoid 140 (labeled in FIG. 4) pressurizing the second compartment 132, to disengage the second locking piston 152 from the second groove 156 to allow axial movement of the first shaft assembly 102 away from the first position of FIGS. 1 and 3. The second locking piston switch 158 is mounted to the solenoid housing 122 and operatively connected to the second locking piston 152 to switch between a first switching state with the second locking piston 152 engaged to the second groove 156, and a second switching state with the second locking piston 152 disengaged from the second groove 156 for use as an electrical sensor for detecting state of the first shaft assembly 102. A controller 160 is operatively connected to the first and second solenoids 136, 140 for remote actuation of the first shaft assembly 102 back and forth between the first and second positions to couple/decouple the splines 108, 110 as indicated in FIGS. 1-2. The controller 160 is also operatively connected to both switches 146, 158 for confirming state of the first shaft assembly 102, e.g. for remotely determining the state of the decoupling shaft 114 among or between the first and second positions.

Figure 6:
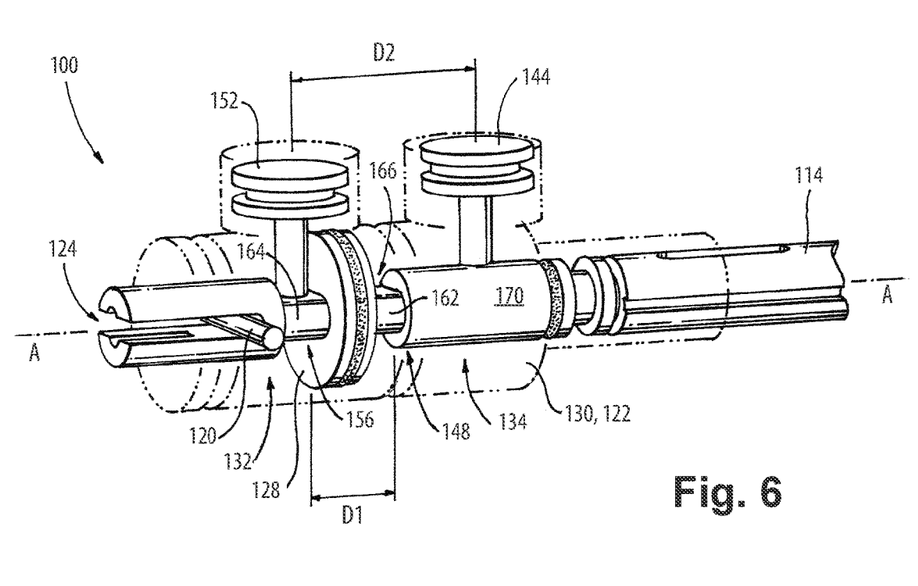
FIG. 6 is a schematic perspective view of a portion of the system of FIG. 1, showing the decoupling shaft in the first position with the cams rotated for pneumatic operation.
Figure 7:
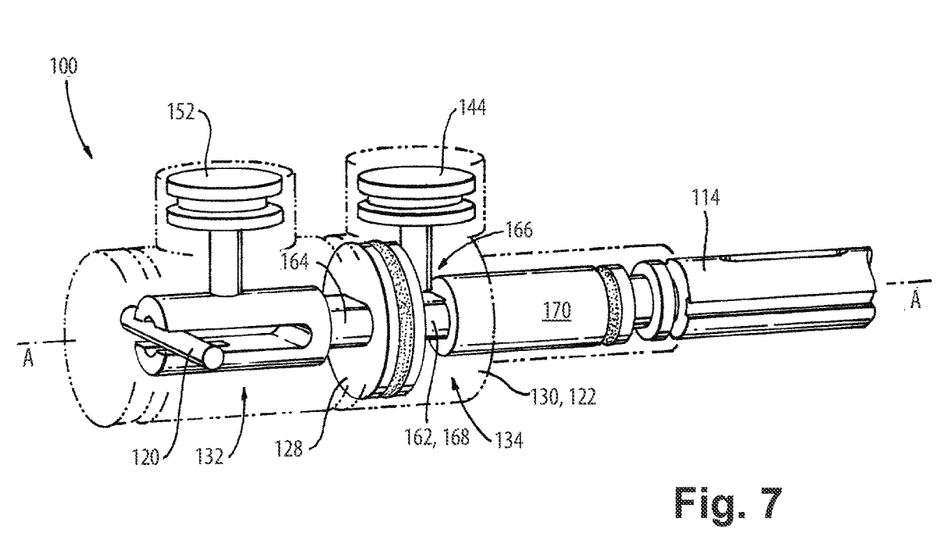
FIG. 7 is a schematic perspective view of a portion of the system of FIG. 1, showing the decoupling shaft in the second position with the cams rotated for pneumatic operation.

FIGS. 6-7 show the pneumatic operation of the system, with FIG. 6 showing the first position also shown in FIG. 1, and FIG. 7 showing the second position also shown in FIG. 2. The first and second grooves 148, 156 are spaced axially apart by a first distance D1, with the pneumatic piston 128 separating the grooves 148, 156. The first and second locking pistons 144, 152 are spaced axially apart by a second distance D2. The first and second distances D1 and D2 are configured so there is no position of the decoupling shaft 114 between the first and second positions wherein the first and the second locking pistons 144, 152 can engage the first and second grooves 148, 156 at the same time.

Figure 12:
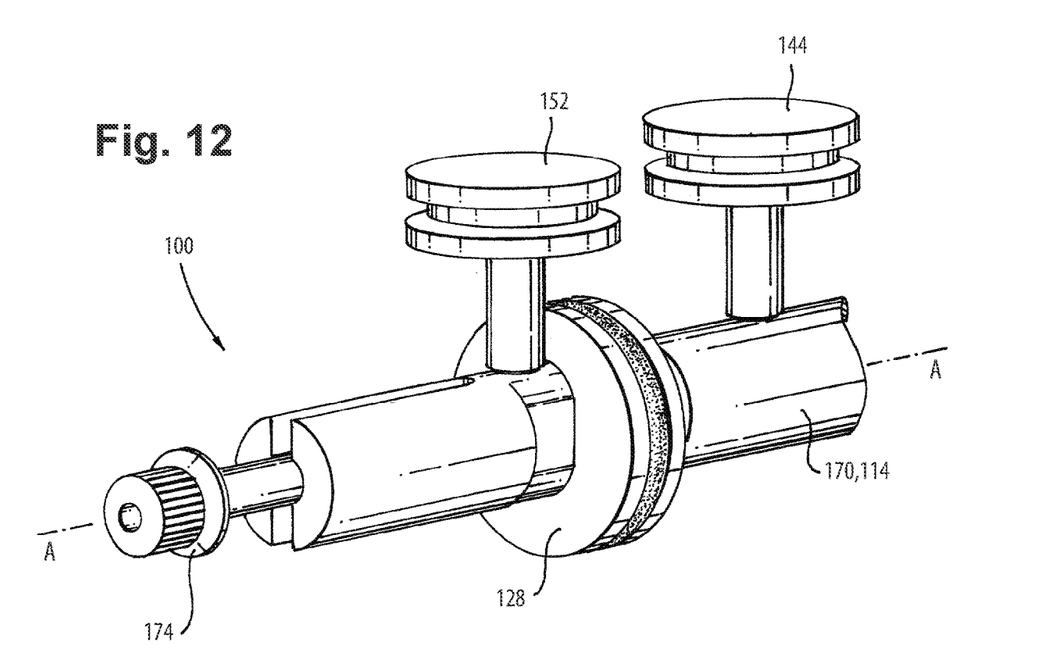
FIG. 12 is a schematic perspective view of a portion of the system of FIG. 1, showing a threaded bolt engaged to the helical threads of the decoupling shaft for manual operation.

The first groove 148 includes a first cam 162 with a first camming surface extending circumferentially around the decoupling shaft 114. With the anti-rotation pin 20 engaged to the groove 124 of the decoupling shaft 114 and to the housing 122 (as shown in FIGS. 1 and 2), the first groove 148 has a deep section 166 of the first cam 162 circumferentially aligned as with the first locking piston 144 for selectively locking and unlocking the first locking piston 144 from the first groove 148 for remotely controlled pneumatic operation. The circumferential alignment of the deep section 166 of the first cam 162 with the first locking piston 144 is shown in both FIGS. 6 and 7, but in FIG. 7 the deep section 166 is also axially aligned with the locking piston 144 so the locking piston locks in the first groove 148. The first cam 162 includes a first tangent portion 168 that is tangent to a first circular portion 170 of the decoupling shaft axially adjacent to the first groove 148. With the locking piston 144 seated in the deep portion 166 of the groove 148, manually rotating the decoupling shaft 114 90-degrees counter clockwise from the position shown in FIG. 8, through the position shown in FIG. 9, to the position in FIG. 10 cams the locking piston 144 outward against the tangent portion 168 of the cam 166, releasing the piston from the groove 148 for manual operation. This can be done with the anti-rotation pin removed, i.e. released from its locked position relative to the housing 122. With the decoupling shaft 114 rotated to circumferentially align the first tangent portion 168 with the first locking piston 144, manual actuation in the axial direction moves the locking piston 144 over the first circular portion 170, as shown in FIG. 12. The second groove 156 has a similar cam 164, which is circumferentially aligned with the first cam 162 so that rotating the decoupling shaft to the position shown in FIG. 10 releases both locking pistons 144, 152.

Figure 8:
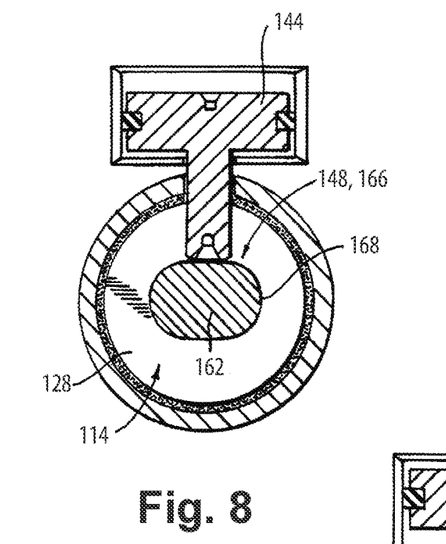
FIG. 8 is a schematic axial end view of a portion of the system of FIG. 1, showing the cam in the position for pneumatic operation.
Figures 9, 10:
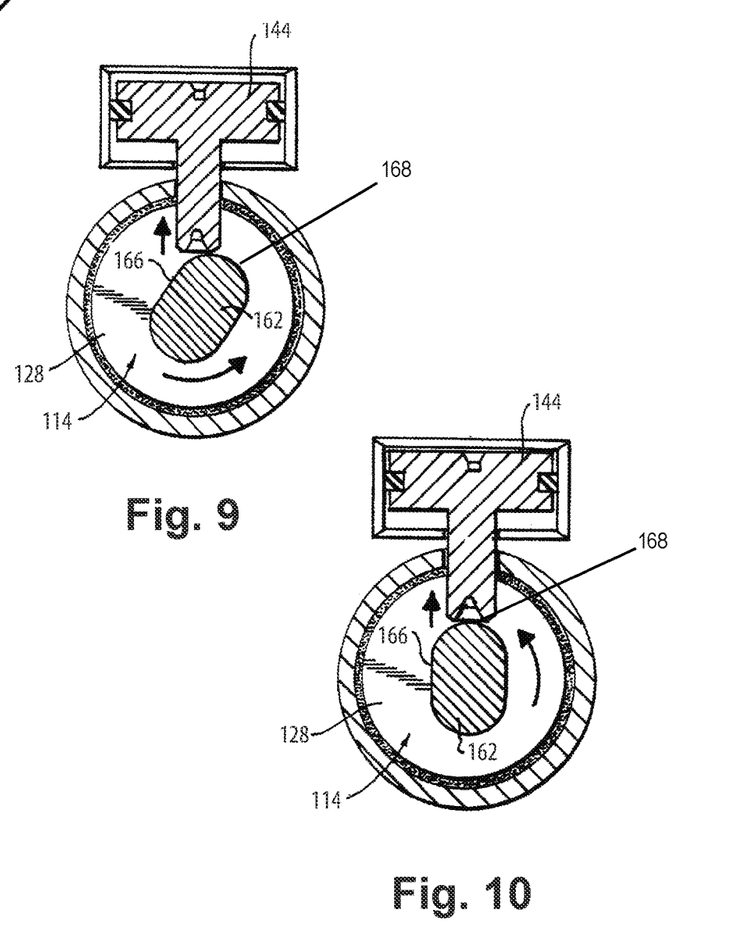
FIG. 9 is a schematic axial end view of a portion of the system of FIG. 1, showing the cam rotating between positions for pneumatic and manual operation.
FIG. 10 is a schematic axial end view of a portion of the system of FIG. 1, showing the cam in the position for manual operation.
Figure 11:
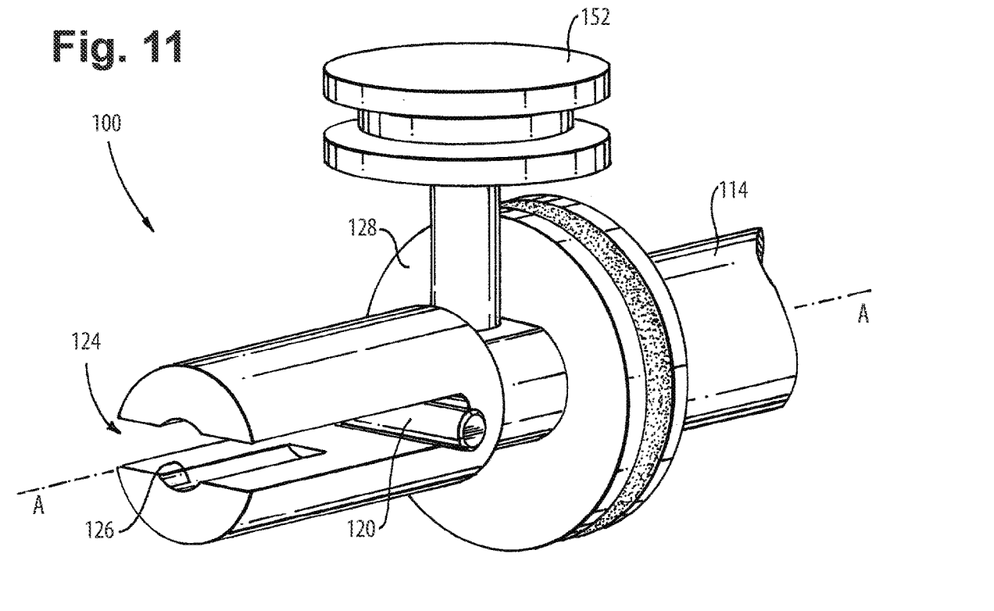
FIG. 11 is a schematic perspective view of a portion of the system of FIG. 1, showing the anti-rotation pin engaged in the decoupling shaft for pneumatic operation.

Returning the system 100 from manual operation back to pneumatic, remotely controlled operation, includes rotation of the decoupling shaft 114 about the longitudinal axis A by 90-degrees to return to the position shown in FIG. 8. The cams 162, 164 are configured so clockwise or counterclockwise rotation gives the same result. The controller 160 (labeled in FIG. 3) is configured to indicate/output an unknown state of the decoupling shaft 114 upon receipt of input from the first and second locking piston switches 146, 158 indicating the neither of the first and second locking pistons 144, 152 are fully seated in the grooves 148, 156. FIGS. 11 and 12 show camming of the second locking piston 152 from its pneumatic operation state in FIG. 11 to its state for manual operation in FIG. 12, where the second locking piston 152 is free to slide axially along the circular portion 172 of the decoupling shaft 114 as the first locking piston 144 is free to slide axially along the circular portion 170. A threaded bolt 174 is shown in FIG. 12 threaded into the threads 126 (labeled in FIG. 11) of the decoupling shaft 114 to facilitate manual actuation.

Systems and methods as disclosed herein provide potential benefits including the following. The cams allow for manual actuation when no power is available to the system. The manual actuation does not require unique tooling. The system can automatically correct to a locked or unlocked state.

Figure 13:
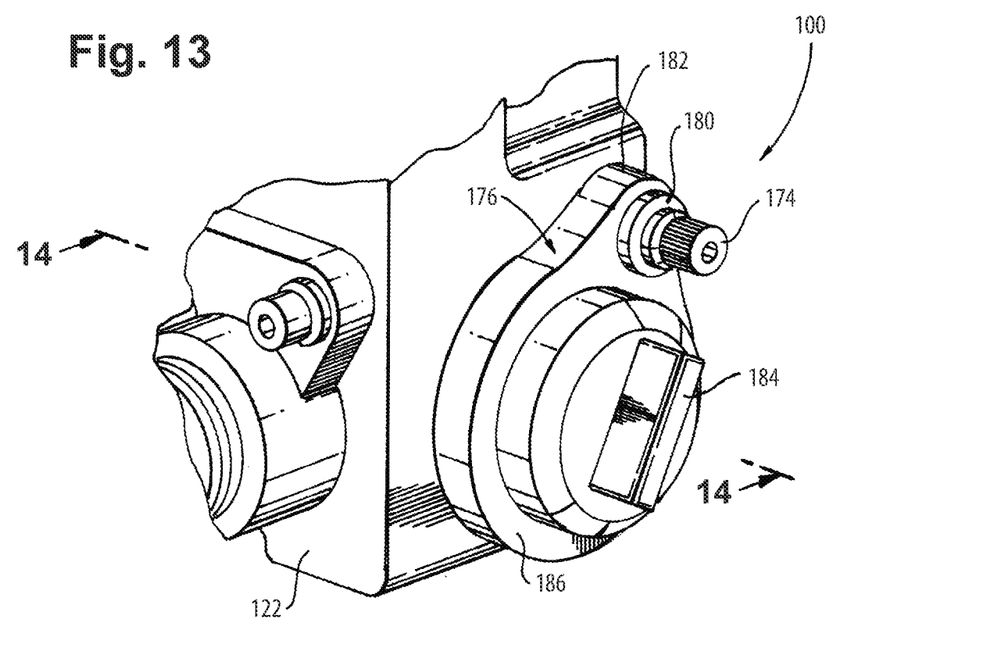
FIG. 13 is a schematic perspective view of a cap in accordance with the present disclosure.
Figure 14:
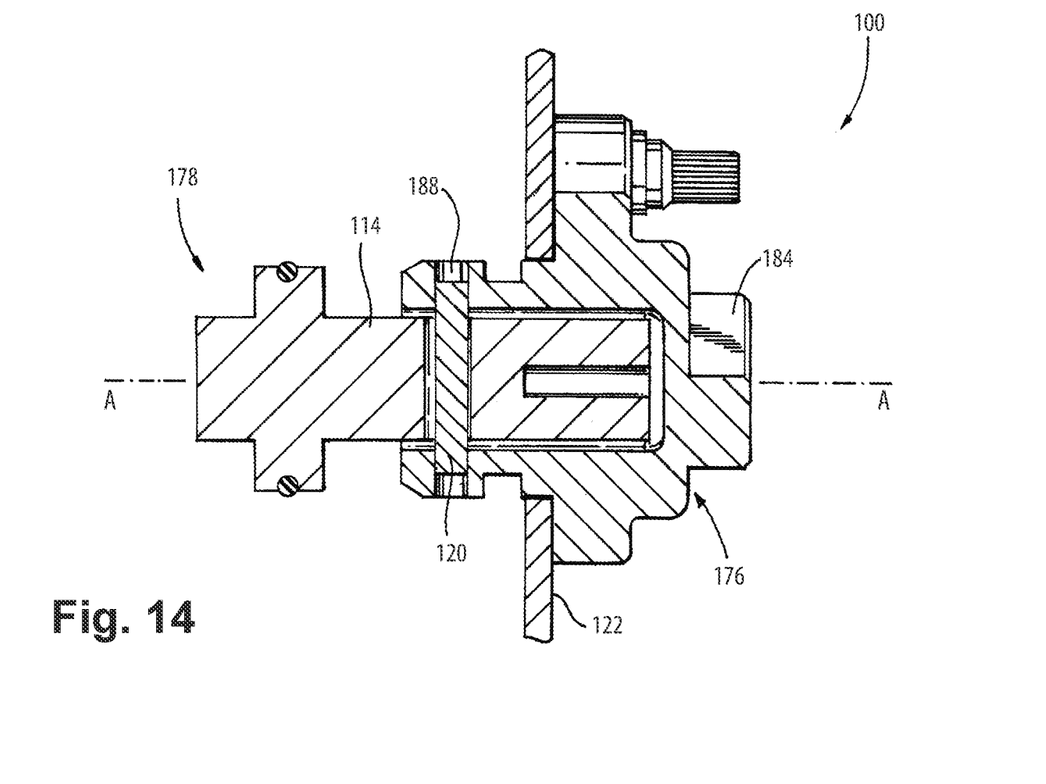
FIG. 14 is a schematic cross-sectional side elevation view of the cap of FIG. 13, showing the cap secured to the system of FIG. 1.

With references to FIGS. 13 and 14, a system 100 includes a cap 176 configured to attach to a first end of a pneumatic disconnect shaft assembly 178, the cap 176 configured to seal a pneumatic chamber 154 (e.g., as shown in FIGS. 1-3) in a pneumatic mode and configured to allow access to the pneumatic chamber 154 in a manual mode for manual rotation of a decoupling shaft 114. The cap 176 can include a bolt bore 180 through the cap 176, the bolt bore 180 configured to align with a bore in a housing 182 (e.g., in FIG. 13 behind the bolt bore 180) of the pneumatic disconnect shaft assembly 178. A bolt 174 can extend through the bolt bore 180 into the bore of the housing 182.

In certain embodiments, the bolt 174 can be configured to secure the cap 176 to the housing 122 in the pneumatic mode thereby sealing the pneumatic chamber 130 of the pneumatic disconnect shaft assembly 178. In other embodiments, the bolt 174 can be removeable from the bolt bore 180 and the bore of the housing 182.

In certain embodiments, the cap 176 can include a tab 184 integrally formed with and extending from an outer surface 186 of the cap 176 along a longitudinal axis A. A user can rotate the tab 184 in the manual mode. The cap 176 can further include an internal bore 188 and an-anti-rotation pin 120 received within the internal bore 188. In the pneumatic mode, the anti-rotation pin 120 can be stationary within the internal bore 188 and the cap 176 can be secured to a housing 122 of the pneumatic disconnect shaft assembly 178 via a bolt 174.

In certain embodiments, as best shown in FIGS. 1-12, the pneumatic disconnect shaft assembly 178 can further include an anti-rotation pin 120 engaged in a diametrical groove 124 through the decoupling shaft 114 to prevent rotation of the decoupling shaft 114 relative to the housing 122 in the pneumatic mode. The anti-rotation pin 120 is fixed in the cap 176 so that when the cap 176 is bolted to the housing 122, the anti-rotation pin 120 is stationary relative to the housing 122. The anti-rotation pin 120 can be configured to be manually removed from the housing 122 via rotation of the cap 176 to allow manual rotation of the decoupling shaft 114 in the manual mode.

In certain embodiments, the anti-rotation pin 120 can be configured to be engaged within the diametrical groove 124 (e.g., as shown in FIG. 12) in the decoupling shaft 114 to facilitate manual rotation of the decoupling shaft 114. The diametrical groove 124 can include a set of axially extending helical threads 126 (e.g., see FIG. 3) configured to engage the bolt 174 to facilitate manual axial actuation of the decoupling shaft 114.

A method for manual rotation of a pneumatic disconnect shaft assembly 178, e.g. starting from when the system 100 is in the pneumatic, remotely controlled mode, includes removing the bolt 174 from the cap 176 that seals a pneumatic chamber 154 of the pneumatic disconnect shaft assembly 178 and rotating the cap 176 about a longitudinal axis A of a decoupling shaft 114. This rotation of the cap 176 utilizes the anti-rotation pin 120 to rotate the decoupling shaft 114, camming a locking piston 144, 152 out of a groove 148, 156 in the decoupling shaft 114 as already described above with reference to FIGS. 11-12.

In certain embodiments, the method can further include removing the cap 176 and its anti-rotation pin 120 to allow for axial movement of the decoupling shaft 114. The method can further include threading the bolt 174 into threads in a diametrical groove 124 within the decoupling shaft 114 of the pneumatic disconnect shaft assembly 178 to facilitate axial movement of the decoupling shaft 114.

In certain embodiments, the method can include returning the system 100 from manual mode to the pneumatic, remotely controlled mode. This can include unthreading the bolt 174 from the diametrical groove 124 in the decoupling shaft 114, inserting the cap 176 and the anti-rotation pin 120 operatively associated therewith into the diametrical groove 124, rotating the cap 176 to cam the locking pistons 144, 152 into the grooves 148, 156. The anti-rotation pin 120 can be secured relative to the housing 122 by inserting the bolt 174 through the cap 176 into a housing 122 of the pneumatic disconnect shaft assembly 178 to seal the pneumatic chamber 154.

Systems and methods as disclosed herein provide potential benefits including the following. The cap serves to maintain pressure in the system and also provide access to the system for manual actuation such as during ground maintenance. This cap interfaces directly with the axially actuated piston and serves as the access point. The cap need not deform during maintenance or require replacement over time. The cap allows ground crew the ability to reengage the system without the use of additional tooling. The cap can handle the harsh environment experienced by the aircraft.

The methods and systems of the present disclosure, as described above and shown in the drawings, provide for facilitated manual actuation of a disconnect mechanism. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system, comprising:
   a pneumatic disconnect shaft assembly comprising:
   a housing defining a pneumatic chamber; and
   a decoupling shaft received within the pneumatic chamber; and
   a cap attached to a first end of the decoupling shaft, wherein the cap attaches to the housing to seal the pneumatic chamber and rotatably couple the cap and the decoupling shaft to the housing in a pneumatic mode and detaches from the housing to allow access to the pneumatic chamber and rotatably uncouple the cap to the housing in a manual mode for manual rotation of the decoupling shaft using the cap.

2. The system of claim 1, wherein the cap includes a bolt bore through the cap configured to align with a bore in the housing of the pneumatic disconnect shaft assembly.

3. The system of claim 2, further including a bolt extending through the bolt bore into the bore of the housing.

4. The system of claim 3, wherein the bolt is configured to secure the cap to the housing in the pneumatic mode thereby sealing the pneumatic chamber of the pneumatic disconnect shaft assembly and rotationally couple the cap and the decoupling shaft to the housing.

5. The system of claim 4, wherein the bolt is removeable from the bolt bore and the bore of the housing.

6. The system of claim 1, wherein the cap includes a tab integrally formed with and extending from an outer surface of the cap along a longitudinal axis.

7. The system of claim 6, wherein a user can rotate the tab in the manual mode.

8. The system of claim 1, wherein the cap further includes an internal bore and an anti-rotation pin received within the internal bore to prevent rotation of the decoupling shaft relative to the housing in the pneumatic mode.

9. The system of claim 8, wherein in the pneumatic mode, the anti-rotation pin is stationary within the internal bore and wherein the cap is secured to the housing of the pneumatic disconnect shaft assembly via a bolt.

10. A system, comprising:
    a pneumatic disconnect shaft assembly comprising:
    a housing defining a pneumatic chamber;
    a decoupling shaft engaged in the housing for axial movement relative to the housing along a longitudinal axis of the decoupling shaft back and forth between a first position for coupling and a second position for decoupling, wherein the decoupling shaft is engaged in the housing for rotational movement relative to the housing about the longitudinal axis; and
    a first locking piston engaged to the housing and operatively connected to a first compartment of the pneumatic chamber of the housing, wherein the first locking piston is biased radially inward to engage a first groove in the decoupling shaft to lock the decoupling shaft in the second position;
    a second locking piston engaged to the housing and operatively connected to a second compartment of the pneumatic chamber, wherein the second locking piston is biased radially inward to engage a second groove in the decoupling shaft to lock the decoupling shaft in the first position; and
    a cap attached to a first end of the decoupling shaft, wherein the cap attaches to the housing to seal the pneumatic chamber and rotatably couple the cap and the decoupling shaft to the housing in a pneumatic mode and detaches from the housing to allow access to the pneumatic chamber and rotatably uncouple the cap to the housing in a manual mode for manual rotation of the decoupling shaft using the cap.

11. The system of claim 10, wherein the pneumatic disconnect shaft assembly further includes an anti-rotation pin engaged in a diametrical groove through the decoupling shaft to prevent rotation of the decoupling shaft relative to the housing in the pneumatic mode.

12. The system of claim 11, wherein the anti-rotation pin is configured to be manually removed from the housing via rotation of the cap to allow manual rotation of the decoupling shaft in the manual mode.

13. The pressure retaining system of claim 12, wherein the anti-rotation pin is configured to be engaged within the diametrical groove in the decoupling shaft to facilitate manual rotation of the decoupling shaft.

14. The system of claim 13, wherein the diametrical groove includes a set of axially extending helical threads configured to engage the bolt to facilitate manual axial actuation of the decoupling shaft.

15. The pressure retaining system of claim 14, wherein the first groove includes a first cam with a first camming surface extending circumferentially around the decoupling shaft, and wherein with the anti-rotation pin engaged to the decoupling shaft and to the housing, the first groove has a deep section of the first cam circumferentially aligned with the first locking piston for selectively locking and unlocking the first locking piston from the first groove for remotely controlled pneumatic operation, and wherein the first cam includes a first tangent portion that is tangent to a first portion of the decoupling shaft axially adjacent to the first groove for manual operation with the anti-rotation pin removed and with the decoupling shaft rotated to circumferentially align the first tangent portion with the first locking piston.

16. The pressure retaining system of claim 15, wherein the second groove includes a second cam with a second camming surface extending circumferentially around the decoupling shaft, and wherein with the anti-rotation pin engaged to the decoupling shaft and to the housing, the second groove has a deep section of the second cam circumferentially aligned with the second locking piston for selectively locking and unlocking the second locking piston from the first groove for remotely controlled pneumatic operation, and wherein the second cam includes a second tangent portion that is tangent to a second portion of the decoupling shaft axially adjacent to the second groove for manual operation with the anti-rotation pin removed and with the decoupling shaft rotated to circumferentially align the second tangent portion with the second locking piston.

17. A method for manual rotation of a pneumatic disconnect shaft assembly, comprising:

removing a bolt from a cap that seals a pneumatic chamber of the pneumatic disconnect shaft assembly; and rotating the cap about a longitudinal axis of a decoupling shaft to rotate the decoupling shaft, camming on ore more locking pistons out of one or more grooves in the decoupling shaft.

18. The method of 17, further including removing the cap an anti-rotation pin operatively associated with the cap to allow for axial movement of the decoupling shaft.

19. The method of claim 18, further including threading the bolt into threads in a diametrical groove within the decoupling shaft of the pneumatic disconnect shaft assembly to facilitate axial movement of the decoupling shaft.

20. The method of claim 19 further including:

unthreading the bolt from the diametrical groove in the decoupling shaft;

inserting the cap and the anti-rotation pin operatively associated therewith into the diametrical groove;

rotating the cap to cam the one or more locking pistons into the one or more grooves to secure the anti-rotation pin; and inserting the bolt through the cap into a housing of the pneumatic disconnect shaft assembly to seal the pneumatic chamber.

\* \* \* \* \*